June 29, 1965  H. W. MOORE  3,191,269
METHOD OF WINDING ARMATURES
Filed Dec. 12, 1958  2 Sheets-Sheet 1

INVENTOR.
HARRY W. MOORE
BY
HIS ATTORNEYS

INVENTOR.
HARRY W. MOORE
BY
HIS ATTORNEYS 3,191,269
METHOD OF WINDING ARMATURES
Harry W. Moore, 5051 Kittridge Road, Dayton, Ohio
Filed Dec. 12, 1958, Ser. No. 780,150
2 Claims. (Cl. 29—155.53)

This invention relates to a method of winding armatures.

When winding commutator type motor, it is necessary to attach the ends of the coils to the commutator segments. Various types of tangs or notches may be used for attaching the leads of the coils or windings to the commutator segments. In the particular embodiment shown herein, hook-like tangs have been used. However, other types of tangs could be used. In connecting the ends of the coils or windings to the commutator segments, if the commutator segment is aligned with the coil, the leads are taut when the coils are wound by automatic winding machines. These taut leads prevent the coils from utilizing much of the space adjacent the armature shaft. In some cases, successive coils are spaced a great distance apart, so that a lead extending from one coil is angularly disposed when extending to the tang and then the lead from the tang is angularly disposed but in the opposite direction from the first lead, to thereby cause the leads to lie close to the armature shaft. However, this method presents problems.

An object of this invention is to provide a method for winding coils wherein the leads from two adjacent coils are hooked over a tang angularly or circumferentially offset from the coils and the return lead or the lead to the succeeding coil is laid in the same slot or a slot adjacent the slot from which the previous coil extends.

Other objects and advantages reside in the construction of parts, the combination thereof, the method of manufacture and the mode of operation, as will become more apparent from the following description.

In the drawings, FIGURE 1 is a perspective view of an armature core having leads extending to two tangs, the tangs being offset at a substantial angle from the slot from which the leads extend.

Figure 5:
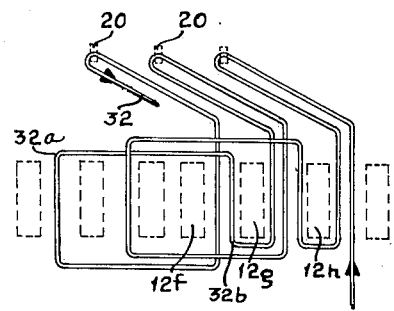

FIGURE 5 discloses a series of coils wound progressively in a counterclockwise direction, as viewed from the bottom of FIGURE 5, wherein the coils lead the position of the leads.

Figure 6:
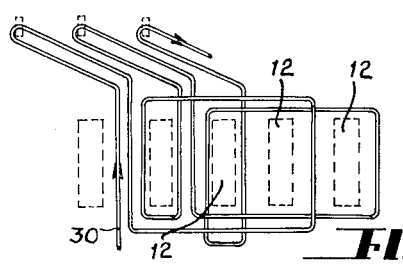

FIGURE 6 discloses a series of coils wound progressively in a clockwise direction, as viewed from the bottom of FIGURE 6, wherein the coils lead the position of the leads.

Figure 4:
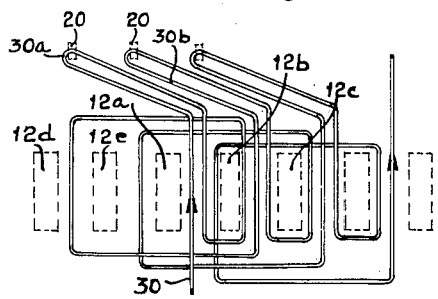
FIGURE 4 illustrates a series of coils wound progressively in a clockwise direction, as viewed from the bottom of FIGURE 4, wherein the coils trail the position of the leads.

FIGURES 7A, 7B, 7C and 7D illustrate successive positions of the apparatus used in hooking the leads on the tangs when winding coils like those shown in FIGURE 4 and FIGURE 6.

FIGURES 8A, 8B, 8C and 8D disclose successive positions of the apparatus used in hooking the leads on the tangs when winding coils like those shown in FIGURE 5.

Referring to the drawings, the reference numeral 10 is used to designate broadly an armature provided with a radially slotted armature core 11 mounted upon an armature shaft 14 supporting the commutator 16 provided with a plurality of circumferentially spaced commutator segments 18, each provided with a hook-shaped tang 20, the hook being directed in a direction away from the core. The armature core 11 has a plurality of circumferentially spaced teeth 12 extending radially and outwardly between the radial slots. The shaft 14 supports tubular members 22 of insulating material. Furthermore, a tubular sleeve 24 of insulating material is positioned between the armature core 11 and the commutator 16. Although the tangs have been shown as integral with the commutator segments, these tangs could be integral with separate pieces abutting the sides of the commutator segments. These pieces may be provided with risers which may be hook-shaped for supporting a lead. Instead of using tangs, slots in the segments for receiving the segments could be used, the leads being welded or soldered to the slots as the armature is being wound. In that event, one of the electrodes of the electric welder (not shown) could replace the hook and the other electrode could engage the slot directly above the lead, so that upon the electrodes being energized, the leads would then be welded to the slot.

Different types or arrangements of windings have been illustrated schematically in FIGURES 4, 5 and 6. These have been shown merely for the purpose of illustration, in that numerous modifications of windings are adaptable for use with the method and apparatus for securing the leads at the ends of the coils to the tangs of the commutator.

In the schematic winding diagram shown in FIGURE 4, a lead or wire 30 enters a slot located between the armature core teeth 12a and 12b. The loop 30a in the lead 30 extends over a tang 20. This tang 20 is circumferentially offset from the slot through which the lead wires terminating in loop 30a project. Since FIGURE 4 is diagrammatic, the tang 20 is illustrated as angularly offset, rather than circumferentially offset, from the aforementioned slot. The lead extends from the tang 20 down through the same slot between the teeth 12a and 12b and then it is hooked around the tooth 12b, one side of the coil being located between the teeth 12b and 12c and the other side of the coil in the slot located between the teeth 12d and 12e. The coil has been illustrated by a single winding, whereas, in reality, the coil may consist of any number of windings or layers, as for example, ten or twelve, more or less. The lead 30b extends to another tang 20 and returns through the same slot hooked around a tooth 12c for winding the succeeding coil. The winding of the coils progresses toward the right, as viewed in FIGURE 4. Each coil is located to the left of the end lead thereof.

In the diagram shown in FIGURE 5, the wire or lead 32 is first hooked on a tang 20, then it extends to the slot found between the teeth 12f and 12g. The coil 32a extends around three teeth. The number of teeth is a matter of choice. The end terminal 32b is hooked around the tooth 12g and extends to the tang 20 through the slot located between the teeth 12g and 12h. In this embodiment the final lead of a coil advances to a slot succeeding the slot containing the coil before advancing to the tang.

In the embodiment shown in FIGURE 6, the direction of the coils with respect to the leads is reversed from that shown in FIGURE 4. It is believed that the wiring diagram in FIGURE 6 is self-explanatory.

Figure 1:
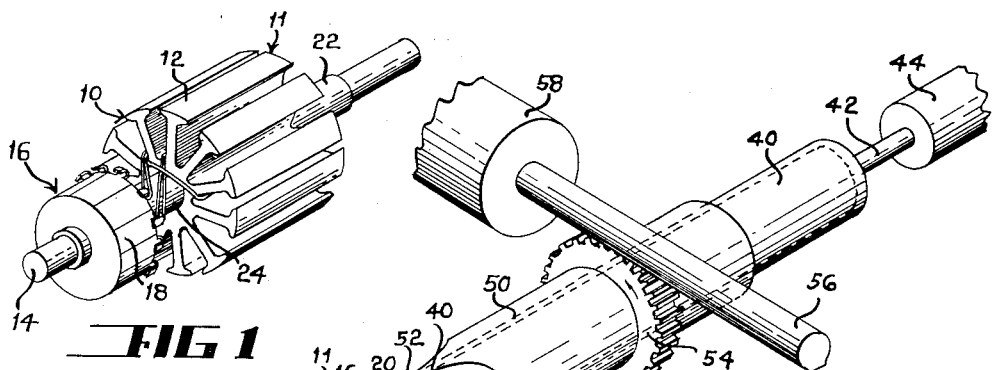
Figure 2:
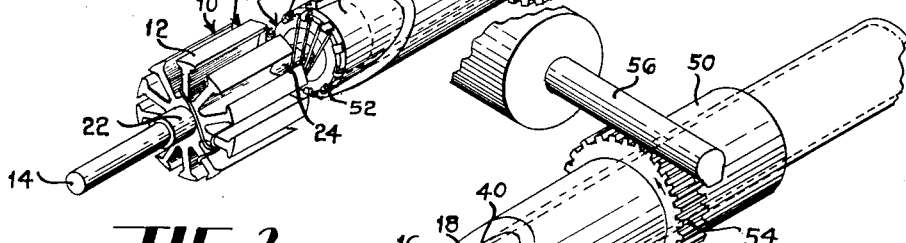
FIGURE 2 is a perspective view of an armature having the commutator mounted in an apparatus for intermittently shielding the tangs and for intermittently deflecting the lead from the normal winding path, so as to hook over or engage a tang on the commutator.
Figure 3:
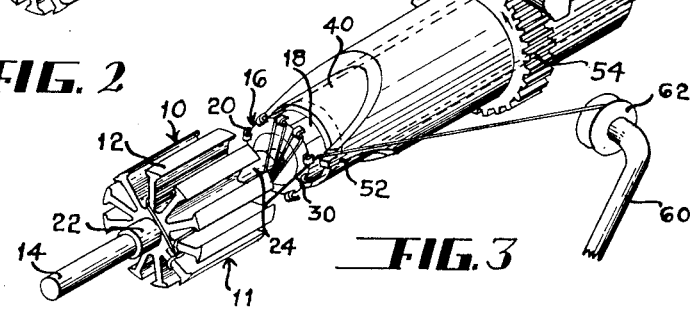
FIGURE 3 is another perspective view similar to FIGURE 2, wherein the shield has been retracted from the tangs and the deflecting means is in the process of hooking the wire on a tang.

The apparatus used in hooking the leads on the tangs has been illustrated in FIGURES 2, 3, 7A to 7D and 8A to 8D. This apparatus will now be described. The apparatus consists of a tubular sleeve or shield 40 overlying the commutator segments and abutting the tangs 20, as shown in FIGURE 2. The sleeve 40 may be adjusted from the position shown in FIGURE 2 to the position shown in FIGURE 3, where the end of the sleeve 40 has been withdrawn from the tangs to thereby expose the tangs. This may be accomplished by connecting a piston rod 42 actuated by a cylinder 44 and connected to the tubular sleeve 40, so as to control the position of the sleeve 40.

Telescopically mounted upon the sleeve 40 is a tubular sleeve 50 provided with lead engaging tang extensions 52. In the particular embodiment shown, two lead engaging tang extensions have been shown. This embodiment is used when two fliers are used to wind two separate coils simultaneously. The sleeve 50 is mounted for rotation upon the sleeve 40 without longitudinal movement of the sleeve 50. A gear ring 54 surrounds and is fixedly attached to the sleeve 50. A toothed rack bar 56, actuated by a hydraulic or pneumatic piston 58 is used to rotate the sleeve 50 through successive steps, as may be required. A flier 60, provided with a wire guide or roller 62, is used in winding the coils. Fliers of this type are used in coil winding machines, as illustrated in the Moore Patent No. 2,627,379. Instead of using hydraulic cylinders to actuate the sleeves 40 and 50, electromagnets or any other suitable driving mechanism may be used within the purview of this invention.

During the winding operation of a coil, the tubular sleeve 40 abuts the tangs 20, so as to provide a shield preventing the wire or leads from engaging any of the tangs during the winding operation. In winding the coils of the type shown in FIGURES 4 and 6, a series of steps used in the winding operation is shown in FIGURES 7A to 7D inclusive, which will now be described.

Figure 7A:
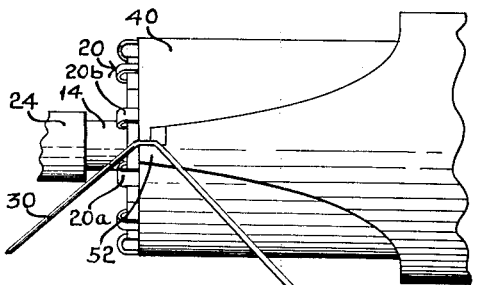

In FIGURE 7A, the sleeve 50 has been rotated so as to rotate the extension 52 which has caught the lead 30 and advanced it in a position between the tangs 20a and 20b. It is to be noted that the lead 30 is located above the tang 20a, as viewed in FIGURE 7A. However, the sleeve 40 shields the tangs when the extension 52 advances the lead upwardly. When the lead enters the position shown in FIGURE 7A, the sleeve 40 is withdrawn into the position shown in FIGURE 7B. The lead 30, extending from the extension 52 to the slot in the core 11, then drops into contact with the segments 18 of the commutator 16 between the tangs 20a and 20b. The sleeve 50 is then reversed, so as to move the extension 52 into the position shown in FIGURE 7C to hook the lead or wire under the tang 20a. At this time the sleeve 40 is actuated from the position shown in FIGURE 7C into the position shown in 7D, so as to shield the tangs and hold the lead under the tang 20a, which has been moved by the flier into some other position in readiness for returning the lead through the slot from whence it came. After the lead has been laid in the slot from whence it came, the armature is indexed, so as to advance a succeeding pair of slots into winding position.

This series of operations is repeated after the winding of each coil that is wound upon the armature core until the armature core has been completely wound. The lead of the first coil and the lead of the last coil are hooked under a tang. The armature is then removed from the fixture or apparatus for winding the coils and moved to a welder where all of the tangs are welded to the leads either simultaneously or in seriatim, as the case may be.

Figure 8A:
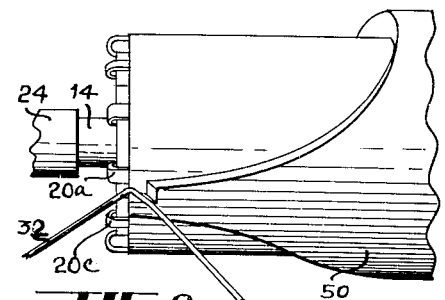
Figure 7B:
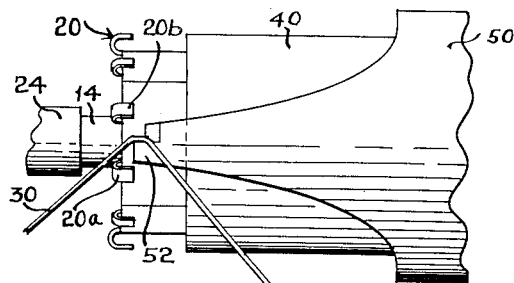
Figure 8B:
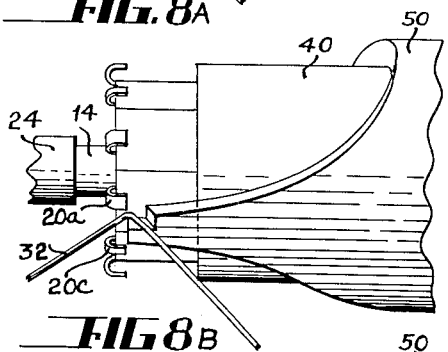
Figure 7C:
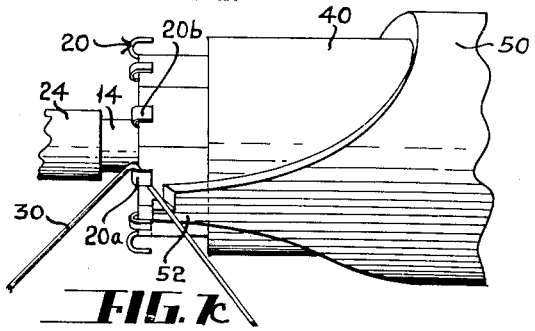
Figure 8C:
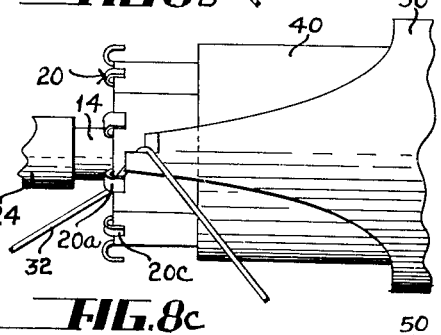
Figure 7D:
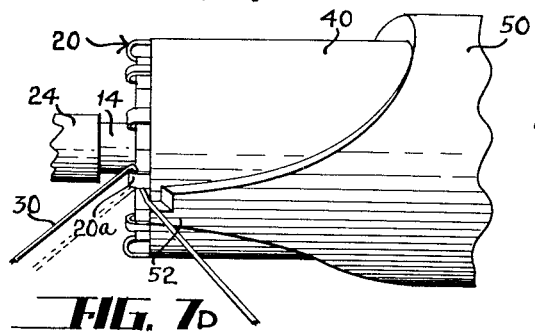
Figure 8D:
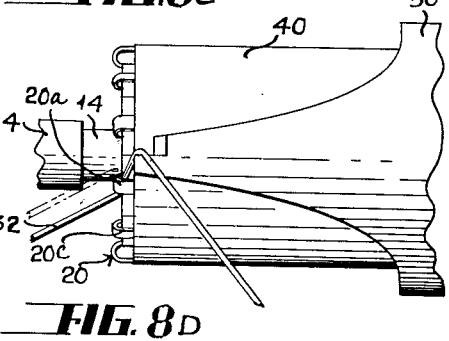

In winding the coils shown in FIGURE 5, it is necessary to reverse the direction of the lead with respect to the tangs of the commutator segments. The successive steps of the apparatus used in winding coils like those shown in FIGURE 5, are shown in FIGURES 8A to 8D. When a coil has been wound and the lead is in the position on the armature core opposite the commutator, as shown in FIGURE 5, the armature is indexed, so that the lead from the first coil 32a extends up between the teeth 12g and 12h before advancing to the tang. Then the extension 52 is moved from inoperative position to operative position, as shown in FIGURE 8A. The shield 40 remains in position until the lead is located between the tang 20a (FIGURE 8A) and the tang 20c. The sleeve 40 is then withdrawn from shielding position, as shown in FIGURE 8A. The lead extending from the extension 52 to the commutator slot, then drops into contact with the commutator segment. The extension 52 advances upwardly, as shown in FIGURE 8B, feeding the lead 30, extending from the commutator slot under the tang 20a, into the position shown in FIGURE 8C. The sleeve 40 is then advanced into shielding position, holding the lead under the tang 20a. The extension 52 and the sleeve 50 are then reversed, so as to move the extension 52 into inoperative position and the winding of the succeeding coil takes place. These steps are repeated until the armature is completely wound.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a method of winding an armature core fixedly mounted on a shaft upon which a commutator is also fixedly mounted, the armature core having a plurality of circumferentially spaced radial slots and the commutator having a plurality of circumferentially spaced lead receiving tangs, the method including the steps of shielding the tangs by a movable shield overlying a portion of the commutator, placing a coil in a pair of slots, the coil having a wire lead extending therefrom projecting out of a slot, removing the shield from tang shielding position, deflecting the lead extending from the coil into permanent engagement with a selected tang circumferentially offset from said last mentioned slot, and moving the shield into tang shielding position while placing a succeeding coil in another pair of slots.

2. In a method of winding an armature core fixedly mounted on a shaft upon which a commutator is also fixedly mounted, the armature core having a plurality of circumferentially spaced radial slots and the commutator having a plurality of circumferentially spaced lead receiving tangs, the method including the steps of shielding the tangs by a movable shield overlying a portion of the commutator, winding a coil having side portions lying in a pair of spaced slots and terminating in a wire lead projecting out of a slot, deflecting a portion of said lead after completion of the winding of the coil into a position circumferentially spaced from said last mentioned slot, removing the shield from tang shielding position, dropping the deflected portion of said lead into permanent engagement with a tang circumferentially spaced from said last mentioned slot, again shielding the tangs by moving the shield into tang shielding position, indexing the armature core, winding a succeeding coil terminating in a lead, again deflecting the lead, removing the shield and dropping the lead into engagement with a tang, and continuing the steps recited above until all of the coils have been wound.

References Cited by the Examiner
UNITED STATES PATENTS

| | | | |
|---|---|---|---|
| 1,375,133 | 4/21 | Cullin | 310—264 |
| 1,571,914 | 2/26 | Fletcher | 310—264 |
| 1,742,190 | 1/30 | Apple | 29—155.53 |
| 1,772,851 | 8/30 | Apple | 29—155.53 |
| 2,202,820 | 6/40 | Baird et al. | 310—234 |
| 2,306,855 | 12/42 | Allen. | |
| 2,348,948 | 5/44 | Allen. | |
| 2,385,619 | 9/45 | Fausset et al. | |
| 2,502,631 | 4/50 | Nash | 29—155.53 X |
| 2,535,438 | 12/50 | McCollom | 242—13 |
| 2,627,379 | 2/53 | Moore | 242—13 |
| 2,648,792 | 8/53 | Wylie | 29—155.54 X |
| 2,756,354 | 7/56 | Baron | 310—234 |
| 2,790,101 | 4/57 | Clagett | 310—234 |
| 2,883,119 | 4/59 | Braun | 242—13 |

JOHN F. CAMPBELL, *Primary Examiner*.

MILTON O. HIRSHFIELD, WHITMORE A. WILTZ, ARTHUR M. HORTON, *Examiners*.